(12) United States Patent
Nakamoto et al.

(10) Patent No.: US 12,030,268 B2
(45) Date of Patent: Jul. 9, 2024

(54) PIPE JOINT MANUFACTURING METHOD AND MOLD

(71) Applicant: SANOH INDUSTRIAL CO., LTD., Tokyo (JP)

(72) Inventors: Yuji Nakamoto, Koga (JP); Fuminori Oba, Koga (JP)

(73) Assignee: SANOH INDUSTRIAL CO., LTD., Tokyo (JP)

(*) Notice: Subject to any disclaimer, the term of this patent is extended or adjusted under 35 U.S.C. 154(b) by 275 days.

(21) Appl. No.: 17/623,446

(22) PCT Filed: Jul. 3, 2020

(86) PCT No.: PCT/JP2020/026238
§ 371 (c)(1),
(2) Date: Dec. 28, 2021

(87) PCT Pub. No.: WO2021/002462
PCT Pub. Date: Jan. 7, 2021

(65) Prior Publication Data
US 2022/0347948 A1 Nov. 3, 2022

(30) Foreign Application Priority Data
Jul. 4, 2019 (JP) .................................. 2019-125367

(51) Int. Cl.
*B29C 70/72* (2006.01)
*B29C 70/68* (2006.01)
*B29L 31/24* (2006.01)

(52) U.S. Cl.
CPC ............ *B29C 70/72* (2013.01); *B29C 70/681* (2013.01); *B29L 2031/24* (2013.01)

(58) Field of Classification Search
CPC ..... B29C 70/681; B29C 70/74; B29C 70/766; B29C 45/0025; F16L 21/02; B29L 2031/24
See application file for complete search history.

(56) References Cited

U.S. PATENT DOCUMENTS

| 6,077,471 A * | 6/2000 | Montgomery .......... B29C 45/33 264/318 |
| 2020/0248846 A1* | 8/2020 | Oba ...................... F16L 37/084 |

FOREIGN PATENT DOCUMENTS

| CN | 102756454 A | 10/2012 |
| JP | H04-282092 A | 10/1992 |

(Continued)

OTHER PUBLICATIONS

JP 2001-277305 A, Machine Translation, 2001 (Year: 2001).*
(Continued)

*Primary Examiner* — Emmanuel S Luk
*Assistant Examiner* — Debjani Roy
(74) *Attorney, Agent, or Firm* — MARSHALL, GERSTEIN & BORUN LLP

(57) ABSTRACT

A manufacturing method for manufacturing a pipe joint including a circular tube-shaped housing and an elastically deformable circular tube-shaped seal member provided at an inner peripheral side of the housing. The pipe joint manufacturing method includes a process of placing the seal member inside a mold in a state in which the seal member is fitted to an outer periphery of a retaining pin, and a process of causing a molten resin to flow into the mold so as to mold the housing in a state in which the seal member is cooled through the retaining pin.

8 Claims, 8 Drawing Sheets

(56) References Cited

FOREIGN PATENT DOCUMENTS

| | | |
|---|---|---|
| JP | H10-193397 A | 7/1998 |
| JP | H10-193399 A | 7/1998 |
| JP | 2001-277305 A | 10/2001 |
| JP | 2003-117978 A | 4/2003 |
| JP | 2012-056289 A | 3/2012 |
| JP | 2018-135996 A | 8/2018 |
| WO | WO-2018/155187 A1 | 8/2018 |

OTHER PUBLICATIONS

Search Report and Written Opinion in International Application No. PCT/JP2020/026238 dated Sep. 8, 2020, 7 pages.
Office Action in JP Application No. 2019-125367 dated Feb. 7, 2023, 3 pages.
Extended European Search Report in EP Application No. 20834192.5 dated Jul. 3, 2023, 9 pages.
Office Action in CN Application No. 202080047756.5 dated dated Mar. 22, 2024, 16 pages.

\* cited by examiner

PIPE JOINT MANUFACTURING METHOD AND MOLD

TECHNICAL FIELD

The present disclosure relates to a pipe joint manufacturing method and a mold.

BACKGROUND ART

Japanese Patent Application Laid-Open (JP-A) No. 2018-135996 discloses a pipe joint in which a circular tube-shaped seal member formed of a material capable of elastically expanding and contracting is provided at an inner peripheral side of circular tube-shaped housing formed of a thermoplastic resin material.

SUMMARY OF INVENTION

Technical Problem

Insert molding is sometimes employed in cases in which members formed of different materials are to be configured as an integral unit as in the pipe joint disclosed in JP-A No. 2018-135996. In cases in which the pipe joint is to be manufactured by insert molding, the seal member is fitted to a retaining pin placed inside a mold used for the insert molding, and molten resin is caused to flow into the mold so as to mold the housing. The pipe joint in which the housing and seal member configure an integral unit is manufactured in this manner.

However, since the mold is heated (pre-heated) prior to starting to fill the molten resin, the seal member inside the mold may become soft (soften) due to this heating. In a state in which the seal member is become soft in such a manner, if the inflow pressure of the molten resin acts directly on the seal member, the seal member may deform such that a gap forms between the seal member and the retaining pin. If the molten resin flows into such a gap, excess resin adheres to and hardens at an inner peripheral face configuring a seal face of the seal member, such that the sealing performance of the seal member of the pipe joint is reduced.

In consideration of the above circumstances, an object of the present disclosure is to provide a pipe joint manufacturing method and a mold, such that when manufacturing a pipe joint including a circular tube-shaped housing and an elastically deformable circular tube-shaped seal member provided at an inner peripheral side of the housing, formation of a gap between the seal member and a retaining pin for retaining the seal member is suppressed.

Solution to Problem

A pipe joint manufacturing method of one aspect of the present disclosure is a manufacturing method for manufacturing a pipe joint including a circular tube-shaped housing and an elastically deformable circular tube-shaped seal member provided at an inner peripheral side of the housing. The pipe joint manufacturing method includes a process of placing the seal member inside a mold in a state in which the seal member is fitted to an outer periphery of a retaining pin, and a process of causing a molten resin to flow into the mold so as to mold the housing in a state in which the seal member is cooled through the retaining pin.

A mold of another aspect of the present disclosure is a mold employed to manufacture a pipe joint including a circular tube-shaped housing and an elastically deformable circular tube-shaped seal member provided at an inner peripheral side of the housing. The mold includes a retaining pin including a cooling channel provided at an inner portion of the retaining pin and configured such that the seal member is fitted to an outer periphery of the retaining pin, an accommodating area configured to accommodate the seal member fitted to the retaining pin, a hollow area for molding the housing and disposed adjacent to the accommodating area, and an inflow port for causing a molten resin to flow into the hollow area. In a cross-section orthogonal to an axial direction of the retaining pin, a mold face of the hollow area that opposes an outer peripheral face of the seal member accommodated in the accommodating area is positioned on a straight line extending along an inflow direction of the molten resin.

Advantageous Effects of Invention

The present disclosure enables the pipe joint manufacturing method and the mold described above to be provided, such that when manufacturing the pipe joint including the circular tube-shaped housing and the elastically deformable circular tube-shaped seal member provided at the inner peripheral side of the housing, formation of a gap between the seal member and the retaining pin for retaining the seal member is suppressed.

DESCRIPTION OF EMBODIMENTS

Explanation follows regarding a pipe joint manufacturing method according to an exemplary embodiment of the present disclosure, with reference to the drawings. First, explanation follows regarding a pipe joint manufactured by the pipe joint manufacturing method of the present exemplary embodiment, followed by explanation regarding a mold employed to manufacture the pipe joint, and the pipe joint manufacturing method itself.

Pipe Joint

Figure 1:
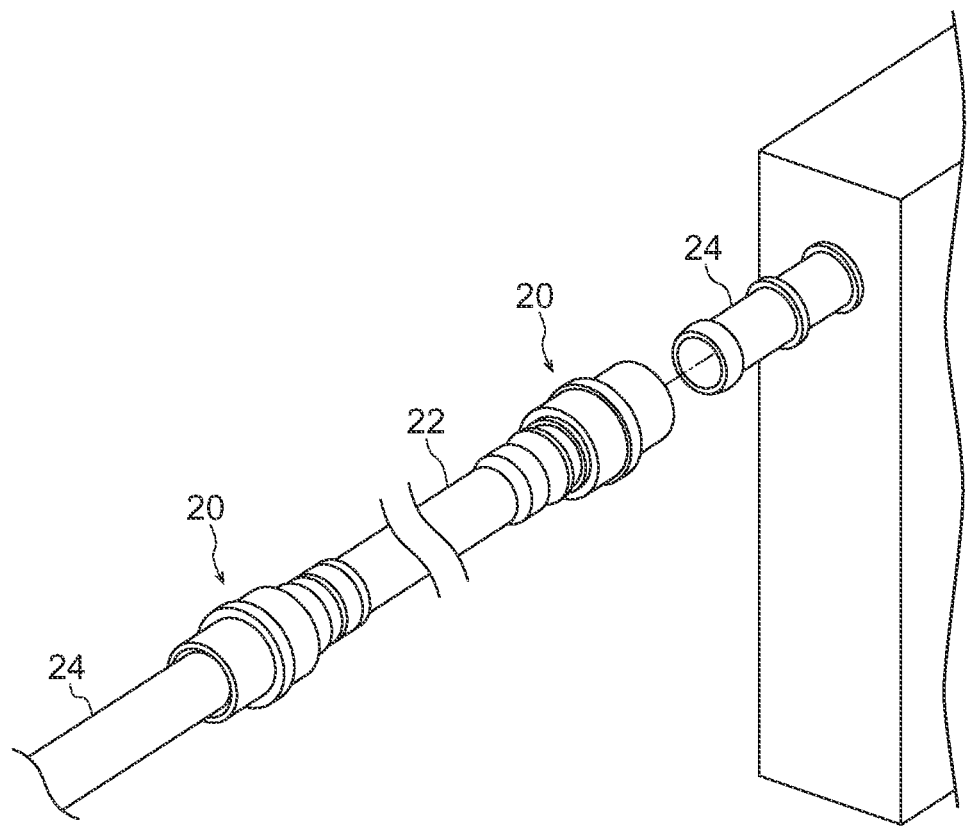
FIG. 1 is a perspective view illustrating a state in which a pipe joint manufactured by a pipe joint manufacturing method according to an exemplary embodiment of the present disclosure is connected to a connecting pipe.
Figure 2:
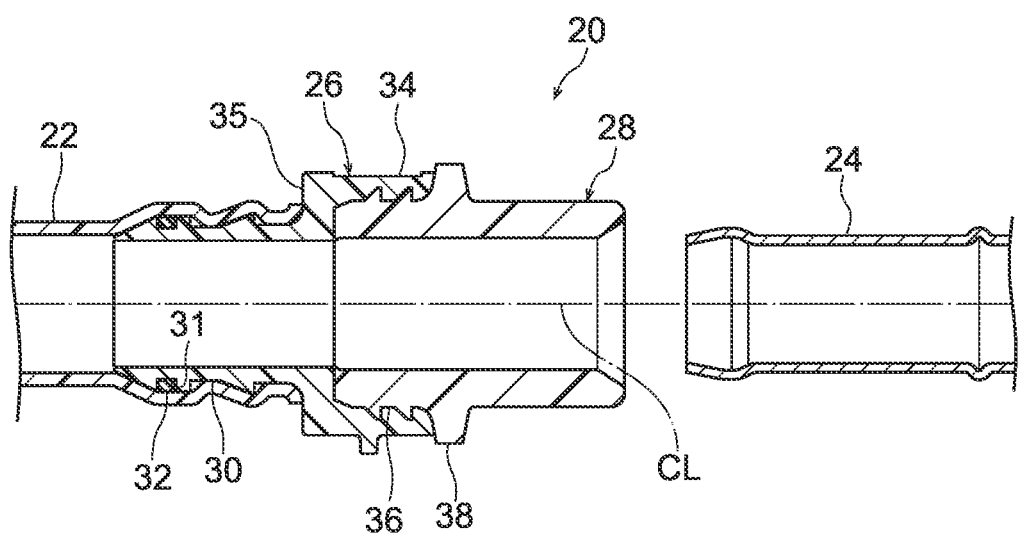
FIG. 2 is a cross-section along an axial direction of the pipe joint illustrated in FIG. 1.

As illustrated in FIG. 1 and FIG. 2, a pipe joint 20 of the present exemplary embodiment is a joint for connecting a resin tube 22 to a connecting pipe 24.

As illustrated in FIG. 2, the pipe joint 20 includes housing 26 and an elastically deformable seal member 28. The pipe joint 20 is molded by insert molding, and the housing 26 and the seal member 28 configure an integral unit. Note that a center line of the pipe joint 20 is indicated by the reference numerals CL in FIG. 2. A direction running along the center line CL indicates an axial direction of the pipe joint 20.

The housing 26 is formed in a circular tube shape of a resin material. A connecting section 30 for connecting to the resin tube 22 is formed to one axial direction end side (the left side in FIG. 2) of the housing 26. A groove 31 is formed extending around a circumferential direction at an outer periphery of the connecting section 30. An O ring 32 is contained in the groove 31. The resin tube 22 is connected to the pipe joint 20 by inserting the connecting section 30 into the resin tube 22.

A join section 34 to which the seal member 28 is joined is formed at another axial direction end side of the housing 26. The join portion 34 has a larger inner diameter and a larger outer diameter than the connecting section 30. A step 35 is thereby formed between the connecting section 30 and the join section 34 of the housing 26. A join section 36 of the seal member 28 (described in detail below) is disposed at an inner peripheral side of the join section 34. An inner periphery of the join section 34 and an outer periphery of the join section 36 are joined together.

The seal member 28 is formed in a circular tube shape of a resin material that is softer and more elastic than the resin material forming the housing 26. The above-mentioned join section 36 is formed on the one axial direction end side (the left side in FIG. 2) of the seal member 28. The inner periphery of the join section 34 is joined to the outer periphery of the join section 36.

Note that in the present exemplary embodiment, protrusions and recesses are respectively formed in corresponding shapes around the inner periphery of the join section 34 and the outer periphery of the join section 36 so as to fit together. This increases the joint strength in the axial direction between the housing 26 and the seal member 28.

The seal member 28 is also formed with a flange 38 adjacent to the join section 36. The flange 38 is pipe shaped, and juts out toward a radial direction outside of the seal member 28 from a portion between one axial direction end and another axial direction end of the seal member 28. Another axial direction end of the housing 26 is joined to one axial direction end side face of the flange 38.

The connecting pipe 24 is connected to the seal member 28 by inserting (press-fitting) the connecting pipe 24 inside the seal member 28.

From the perspective of sealing performance, a thermoplastic elastomer or a thermoset elastomer is preferably employed as the resin material for forming the seal member 28. Examples of thermoplastic elastomers that may be employed include an olefin based elastomer (TPO), a styrene based elastomer (TPS), a polyvinyl chloride based elastomer (TPVC), a polyurethane based elastomer (TPU), a polyester based elastomer (TPC), a polyamide based elastomer (TPA), and the like. Moreover, examples of thermoset elastomers that may be employed include a vulcanized rubber, an ethylene-propylene rubber, a fluoro-rubber, a polysilicone rubber, a hydrogenated nitrile rubber, and the like.

Note that in the present exemplary embodiment an olefin-based elastomer (TPO) is employed as the thermoplastic elastomer for forming the seal member 28.

From the perspective of strength, for example, a reinforced resin, such as a polypropylene based resin, a polyamide based resin, or a polyphenylene sulfide based resin into which glass fibers have been blended is preferably employed as the resin material for forming the housing 26.

Note that in the present exemplary embodiment a reinforced resin of glass fibers blended into a polypropylene resin is employed as the resin material for forming the housing 26. In this manner, by employing a reinforced resin configured by glass fibers blended into a polypropylene resin for mold the housing 26, this reinforced resin has good compatibility during insert molding with the seal member 28 formed from an olefin-based elastomer (TPO) containing a polypropylene resin, and so the housing 26 and the seal member 28 are strongly joined (integrated) together. Specifically, due to polymer chains of the polypropylene resins respectively contained in the materials of both the housing 26 and the seal member 28 becoming entangled with each other during insert molding, the housing 26 and the seal member 28 are strongly joined together.

Mold

Next, explanation follows regarding a mold 40 employed to manufacture the pipe joint 20.

Figure 3:
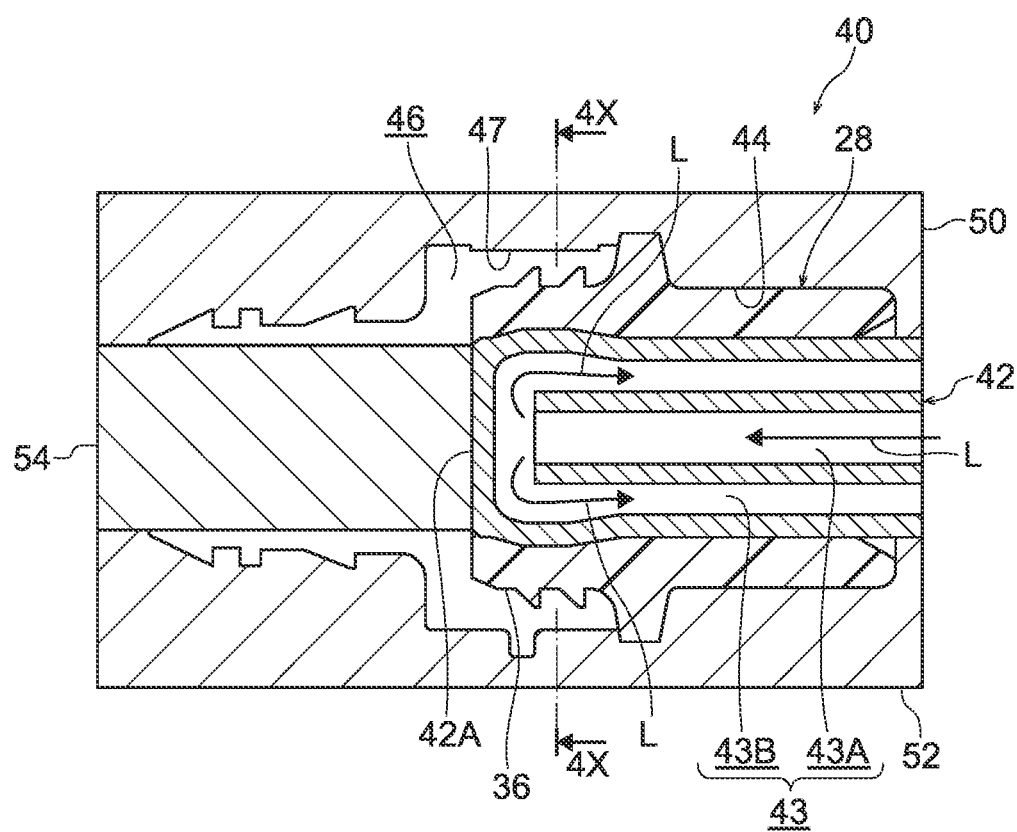
FIG. 3 is a vertical cross-section of a mold according to an exemplary embodiment of the present disclosure, illustrating a state in which a seal member is accommodated inside the mold.
Figure 4:
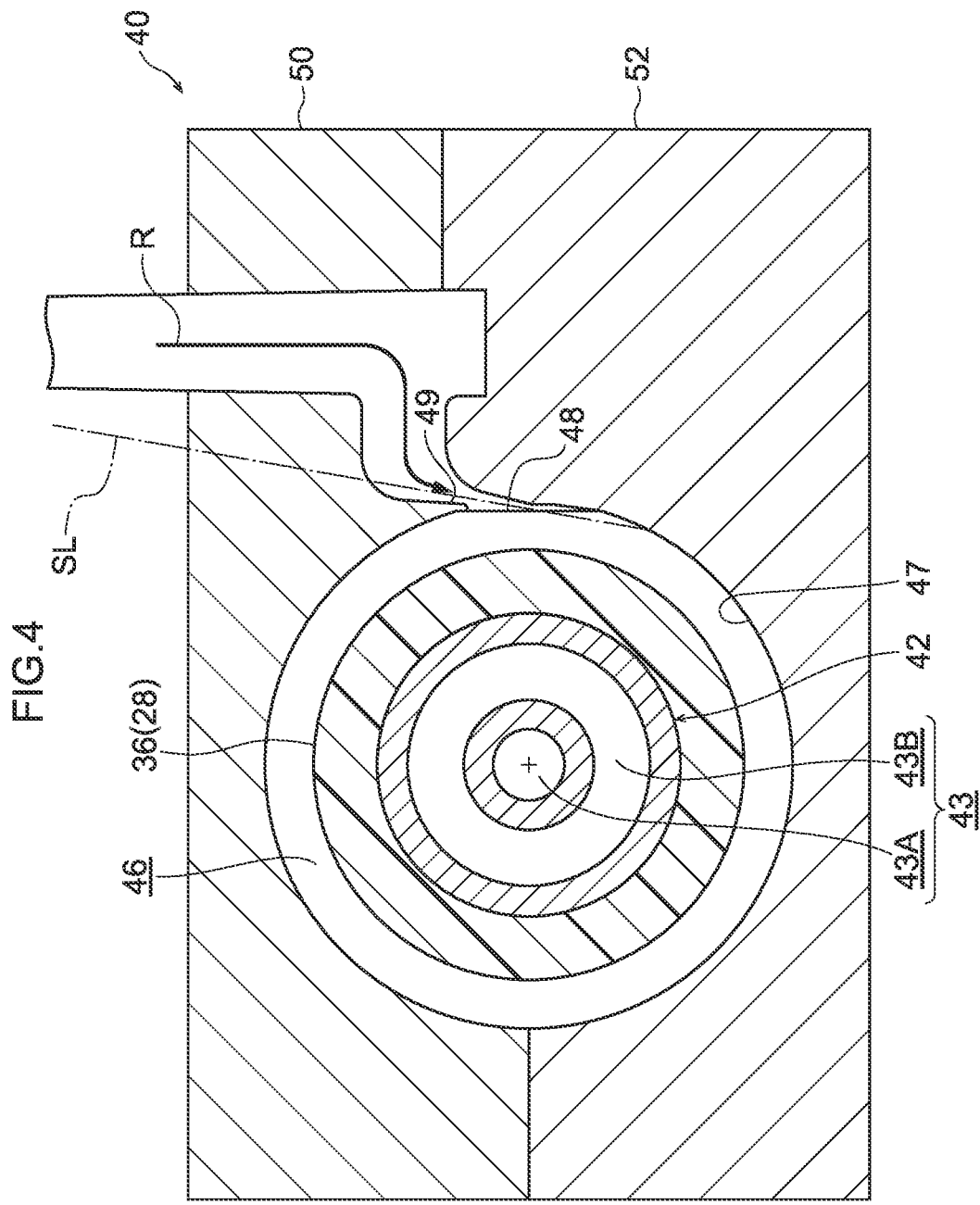
FIG. 4 is a horizontal cross-section along line 4X-4X of the mold illustrated in FIG. 3.

As illustrated in FIG. 3 and FIG. 4, the mold 40 is a mold used for insert molding. The mold 40 includes a retaining pin 42 that also serves as a core, an accommodating area 44, a hollow area 46, and an inflow port 48. The mold 40 also includes a fixed mold 50, a movable mold 52, and a core 54.

As illustrated in FIG. 3, the retaining pin 42 is a member that supports the seal member 28 from the inside so as to maintain the shape of the seal member 28 in a state in which the seal member 28 is fitted thereto. The retaining pin 42 is capable of moving along an axial direction of the retaining pin 42 with respect to the fixed mold 50. A cooling channel 43 is provided at an inner portion of the retaining pin 42. Specifically, the retaining pin 42 has a double-layered pipe structure including the cooling channel 43 serving as a circulation route for a fluid L. The cooling channel 43 includes an outward flow path 43A for the fluid L formed inside an inner pipe, and a return flow path 43B for the fluid L formed between the inner pipe and an outer pipe. Note that in the present exemplary embodiment, the fluid L is conveyed into the outward flow path 43A from a non-illustrated device that emits the fluid L. On reaching a leading end portion 42A of the retaining pin 42, the conveyed fluid L flows into the return flow path 43B. For example, cooling water may be employed as the fluid L.

As illustrated in FIG. 3 and FIG. 4, the accommodating area 44 is a hollow area formed between the fixed mold 50 and the movable mold 52 when the mold is in a closed state, and is an area where the seal member 28 retained by the retaining pin 42 is accommodated. Note that the accommodating area 44 is formed by accommodating recesses respectively provided in the fixed mold 50 and the movable mold 52.

The hollow area 46 is a hollow area formed between the fixed mold 50, the movable mold 52, and the core 54 in the mold-closed state in order to mold the housing 26. The hollow area 46 is disposed adjacent to the accommodating area 44. Note that the hollow area 46 is formed by mold recesses respectively provided in the fixed mold 50 and the movable mold 52, and by the core 54.

The inflow port 48 is an opening for causing a molten resin R to flow into the hollow area 46. In the present exemplary embodiment, the inflow port 48 is formed by an opening provided in a mold face of the molding recess of the movable mold 52 for molding the housing 26. Alternatively, the inflow port 48 may be formed by respective openings provided in a mold face of the molding recess of the fixed mold 50 for molding the housing 26 as well as in the mold face of the molding recess of the movable mold 52 for molding the housing 26.

In a cross-section orthogonal to the axial direction of the retaining pin 42 as illustrated in FIG. 4, a mold face 47 of the hollow area 46 that opposes an outer peripheral face of the seal member 28 accommodated in the accommodating area 44 is positioned on a straight line SL extending along an inflow direction of the molten resin R. Note that the mold face 47 is a mold face for molding an outer peripheral face of the housing 26 in the hollow area 46. Note that the "inflow direction of the molten resin R" refers here to a direction in which the molten resin R flows through the inflow port 48 into the mold 40 (hollow area 46), and is a direction running along a center line (coaxial to the straight line SL) between flow-path walls of a constricted flow path 49 where the molten resin R is constricted on progression toward the inflow port 48.

Note that the movable mold 52 is capable of moving in a mold-opening direction and a mold-closing direction with respect to the fixed mold 50. The core 54 is capable of moving along an axial direction of the core 54 with respect to the fixed mold 50. The axial cores of the core 54 and the retaining pin 42 are aligned.

Pipe Joint Manufacturing Method

Next, explanation follows regarding the manufacturing method of the pipe joint 20.

In the manufacturing method of the pipe joint 20, first, the seal member 28 is fitted to an outer periphery of the retaining pin 42. The seal member 28 is thereby supported from the inside and the shape of the seal member 28 is maintained by the retaining pin 42.

Next, the seal member 28 is contained in the accommodating area 44 in a state in which the seal member 28 is fitted to the retaining pin 42 (in other words, in a state in which the shape of the seal member 28 is maintained by the retaining pin 42). Namely, the seal member 28 is placed inside the mold 40.

Next, as illustrated in FIG. 3, the fluid L is made to flow in the cooling channel 43 at a temperature of between −30° C. and 20° C. for example, so as to cool the retaining pin 42. The seal member 28 that is in contact with the retaining pin 42 is cooled by heat conduction accompanying this cooling of the retaining pin 42.

Figure 5:
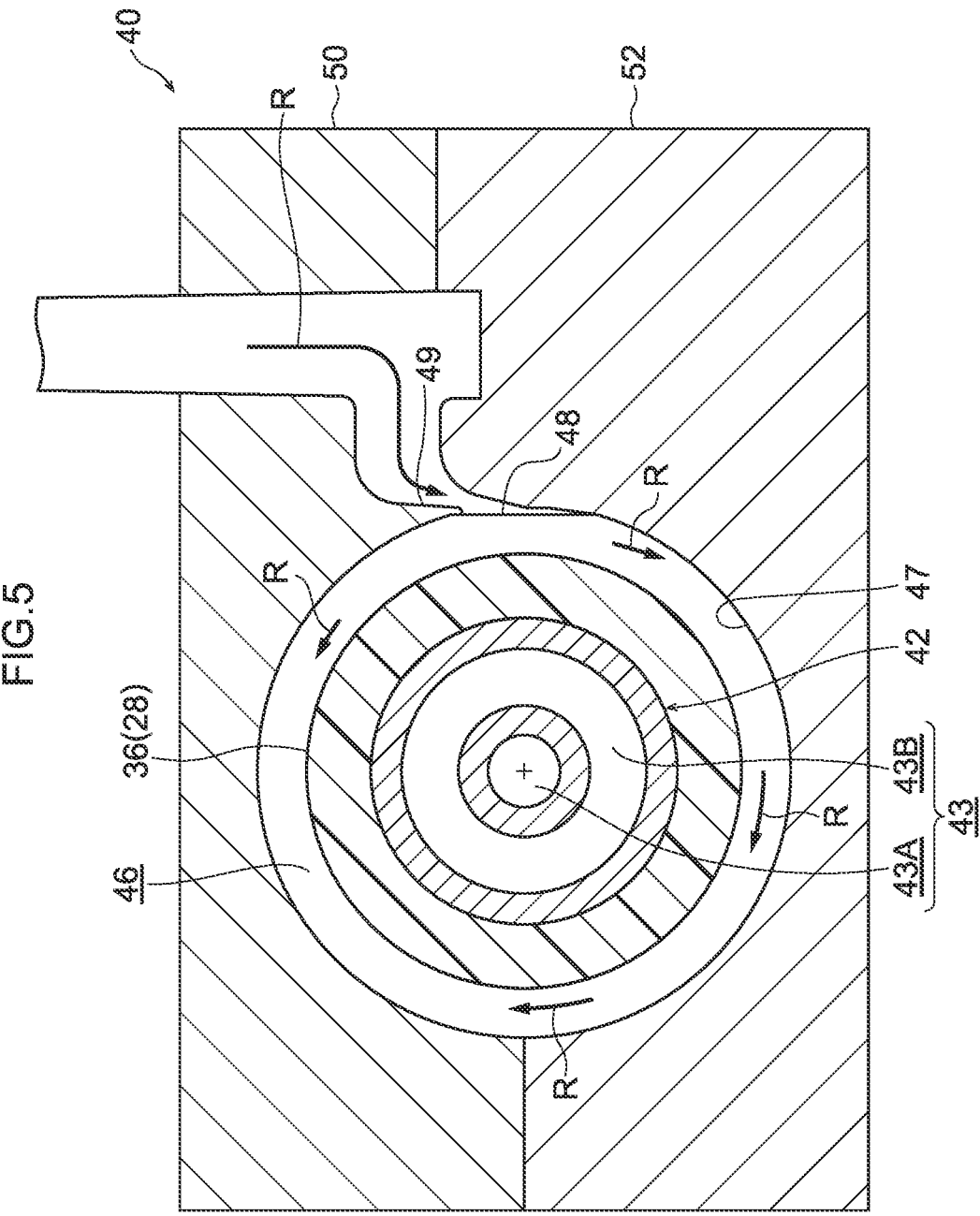
FIG. 5 is a horizontal cross-section illustrating a state in which a molten resin is flowing into a mold.
Figure 6:
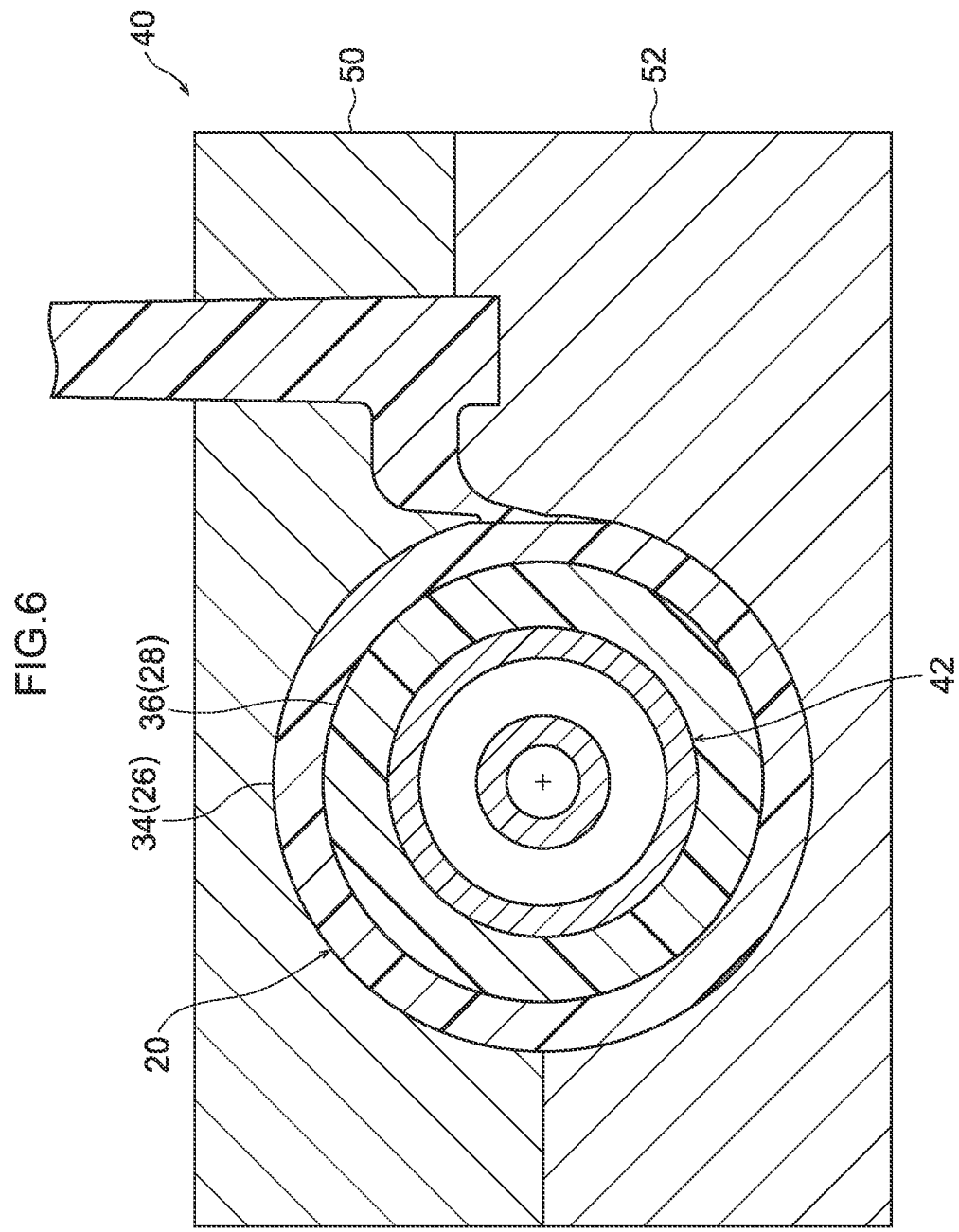
FIG. 6 is a horizontal cross-section illustrating a state in which filling of a molten resin into a mold is complete.
Figure 7:
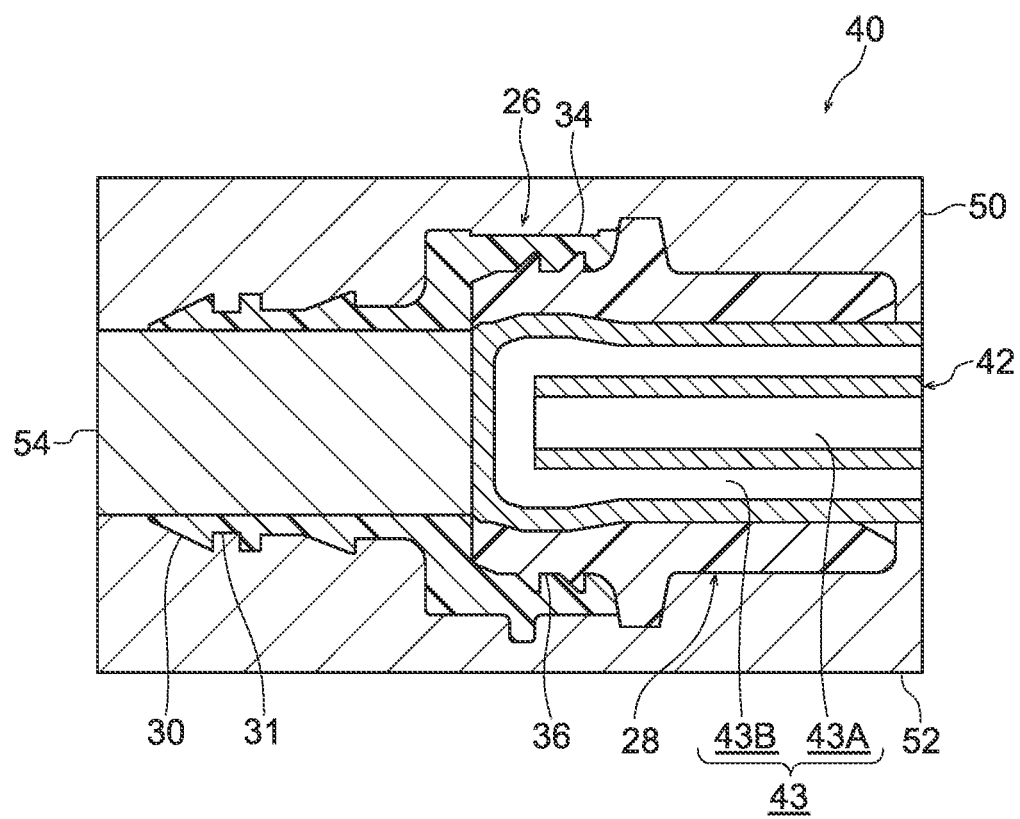
FIG. 7 is a vertical cross-section (a cross-section corresponding to FIG. 3) of a mold.
Figure 8:
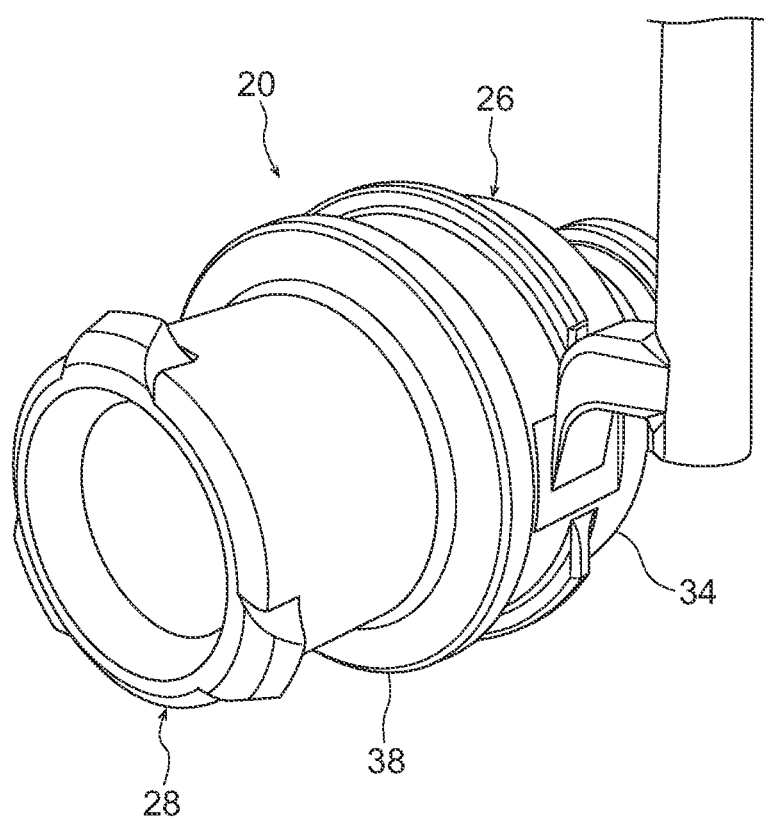
FIG. 8 is a perspective view of a pipe joint that has been taken out of a mold.

Next, in a state in which the seal member 28 is cooled through the retaining pin 42, as illustrated in FIG. 5, the molten resin R is caused to flow through the inflow port 48 and into the hollow area 46 adjacent to the accommodating area 44. Specifically, the molten resin R is caused to flow toward the mold face 47 configuring part of the hollow area 46 of the mold 40. The molten resin R that has flowed in contacts the mold face 47, flows around the outer periphery of the seal member 28, and fills into the hollow area 46. The housing 26 is molded by filling the molten resin R into the hollow area 46 in this manner (see FIG. 6 to FIG. 8).

After the cooling and hardening of the molten resin R is complete, the retaining pin 42 is moved along the axial direction, and the movable mold 52 is opened when the retaining pin 42 is at a position completely away from the inside of the seal member 28. The core 54 is moved away accompanying this opening of the movable mold 52. Manufacturing of the pipe joint 20 is then completed by removing the pipe joint 20 from the retaining pin 42.

Note that configuration may be such that the movable mold 52, the core 54, and the retaining pin 42 are moved according to the following actions. Namely, after cooling and hardening of the molten resin R is complete, the movable mold 52 is moved in the mold-opening direction with respect to the fixed mold 50. Next, the core 54 and the retaining pin 42 are both moved in directions away from the fixed mold 50.

Note that in the present exemplary embodiment, since the fluid L continuously flows through the cooling channel 43 at approximately the temperature range given in the above example, cooling of the seal member 28 is started at the same time as the seal member 28 is fitted to the retaining pin 42. The cooling temperature of the seal member 28 is stabilized, and temperature control is facilitated as a result. This continuous cooling is merely an example. For example, cooling of the seal member 28 may be started prior to the seal member 28 being accommodated in the accommodating area 44, or prior to the molten resin R being caused to flow into the hollow area 46 after the seal member 28 has been accommodated in the accommodating area 44 (prior to starting the filling), and this cooling may be continued until cooling and hardening of the molten resin R filled into the hollow area 46 is complete. After cooling and hardening of the molten resin R is complete, cooling may be continued (continuous cooling), or cooling may be ended. When the cooling is ended after the cooling and hardening of the molten resin R is complete, heat from the mold moves to the retaining pin 42 and warms the retaining pin 42. Thus, seal member 28 becomes softer or less elastic than in cases in which cooling is continued after hardening is complete. Since resistance when the pipe joint 20 is removed from the mold 40 is lowered as a result, the pipe joint 20 can easily be removed from the mold 40.

Note that pre-heating (to 150° C. or above) of the mold 40 prior to causing the molten resin R to flow therein is continuously performed. This pre-heating of the mold 40 may be started prior to starting cooling of the seal member 28, or may be started after starting cooling of the seal member 28.

Next, explanation follows regarding operation and advantageous effects of the present exemplary embodiment.

In the manufacturing method of the pipe joint 20, since the molten resin R is caused to flow into the hollow area 46 in a state in which the seal member 28 is cooled through the retaining pin 42, a rise in the temperature of the seal member 28 accompanying pre-heating of the mold 40 is better suppressed than for example in a manufacturing method in which the molten resin R is caused to flow into the hollow area 46 in a state in which the seal member 28 is not cooled. By suppressing a rise in the temperature of the seal member 28 in this manner, the seal member 28 is suppressed from becoming softer (softening), such that deformation of the seal member 28 due to the inflow pressure of the molten resin R is suppressed. This suppresses formation of a gap between the seal member 28 and the retaining pin 42 when the housing 26 of the pipe joint 20 is being molded (when the molten resin R is caused to flow into the hollow area 46 of the mold 40).

Moreover, in the manufacturing method of the pipe joint 20, the mold 40 is employed in which the mold face 47 of the hollow area 46 is positioned on the straight line SL extending along the inflow direction of the molten resin R, such that the molten resin R flows in toward the mold face 47. Thus, the inflow pressure of the molten resin R occurring when the molten resin R starts filling into the hollow area 46 does not act directly on the seal member 28. Thus, in the manufacturing method of the pipe joint 20, deformation of the seal member 28 due to the inflow pressure of the molten resin R is better suppressed than for example in a manufacturing method in which the molten resin R is caused to flow in toward the seal member 28 employing a mold configured such that the seal member 28 is positioned on the straight line SL extending along the inflow direction of the molten resin R. This further suppresses formation of a gap between the seal member 28 and the retaining pin 42 when the housing 26 of the pipe joint 20 is being molded. This suppresses excess resin from adhering to and hardening at an inner peripheral face configuring a seal face of the seal member 28 due to the molten resin flowing into such a gap, such that a reduction in the sealing performance of the seal member 28 of the pipe joint 20 is suppressed.

In the manufacturing method of the pipe joint 20, cooling of the seal member 28 is continued until cooling and hardening of the molten resin R filled into the hollow area 46 is complete. This enables the time required to cool and harden the molten resin R to be reduced compared for example to a manufacturing method in which cooling of the seal member 28 is not continued until cooling and hardening of the molten resin R is complete. This improves productivity of the pipe joint 20.

In the manufacturing method of the pipe joint 20, the seal member 28 is cooled through the retaining pin 42 by causing the fluid L to flow through the cooling channel 43 provided to the inner portion of the retaining pin 42. Since the outer peripheral profile of the retaining pin 42 and the inner peripheral profile of the seal member 28 have the same shape and are in close contact with one another, the seal member 28 can be efficiently cooled through the retaining pin 42, enabling the energy required for cooling to be reduced.

Exemplary embodiments of the present disclosure have been described using the above exemplary embodiment as an example. However, this exemplary embodiment is merely an example, and various modifications may be implemented within a range not departing from the spirit of the present disclosure. Moreover, obviously the scope of rights of the present disclosure is not limited to the above exemplary embodiment.

The following supplements are disclosed in relation to the above exemplary embodiment.

Supplement 1

A manufacturing method for manufacturing a pipe joint including a circular tube-shaped housing and an elastically deformable circular tube-shaped seal member provided at an inner peripheral side of the housing, the pipe joint manufacturing method including:
  a process of placing the seal member inside a mold in a state in which the seal member is fitted to an outer periphery of a retaining pin; and
  a process of causing a molten resin to flow into the mold so as to mold the housing in a state in which the seal member is cooled through the retaining pin.

In the pipe joint manufacturing method of supplement 1, first, the seal member is fitted to the outer periphery of the retaining pin. The shape of the seal member is thereby maintained by the retaining pin. Next, the seal member is placed inside the mold in a state in which the seal member is fitted to the retaining pin. Next, the molten resin is made to flow into the mold so as to mold the housing in a state in which the retaining pin has been cooled, and the seal member has been cooled through the cooled retaining pin. The pipe joint provided with the circular tube-shaped seal member at the inner peripheral side of the circular tube-shaped housing is manufactured in this manner.

In this pipe joint manufacturing method, since the molten resin is caused to flow into the mold in a state in which the seal member is cooled through the retaining pin, a rise in the temperature of the seal member due to heating the mold so as to allow the molten resin to flow in is better suppressed than for example in a manufacturing method in which molten resin is caused to flow into the mold in a state in which the seal member is not cooled. By suppressing a rise in the temperature of the seal member in this manner, softening of the seal member is suppressed, such that deformation of the seal member due to the inflow pressure of the molten resin is suppressed. This suppresses formation of a gap between the seal member and the retaining pin when the housing of the pipe joint is being molded (when the molten resin is made to flow into the mold).

Supplement 2

The pipe joint manufacturing method of supplement 1, wherein the molten resin is caused to flow in toward a mold face of the mold opposing an outer peripheral face of the seal member placed inside the mold.

When the molten resin flows into the mold, if the molten resin is made to flow in toward the seal member, the inflow pressure of the molten resin occurring when the filling of the molten resin starts might act directly on the seal member, causing the seal member to deform. Note that in the pipe joint manufacturing method of supplement 2, the molten resin is caused to flow in toward the mold face of the mold opposing the outer peripheral face of the seal member placed inside the mold, and so the inflow pressure of the molten resin occurring when the filling of the molten resin starts does not act directly on the seal member. Thus, in this pipe joint manufacturing method, deformation of the seal member due to the inflow pressure of the molten resin is better suppressed than for example in a manufacturing method in which the molten resin is made to flow in toward the seal member. This further suppresses formation of a gap between the seal member and the retaining pin when the housing of the pipe joint is being molded.

Supplement 3

The pipe joint manufacturing method of supplement 1 or supplement 2, wherein cooling of the seal member is continued until cooling and hardening of the molten resin filled into the mold is complete.

In the pipe joint manufacturing method of supplement 3, the cooling of the seal member is continued until cooling and hardening of the molten resin filled into the mold is complete. This enables the time required to cool and harden the molten resin to be reduced compared for example to a manufacturing method in which cooling of the seal member is not continued until cooling and hardening of the molten resin is complete. This improves pipe joint productivity.

Supplement 4

The pipe joint manufacturing method of any one of supplement 1 to supplement 3, wherein:
  a cooling channel is provided at an inner portion of the retaining pin; and
  the seal member is cooled through the retaining pin by causing a fluid to flow through the cooling channel.

In the pipe joint manufacturing method of supplement 4, the seal member is cooled through the retaining pin by causing the fluid to flow through the cooling channel provided at the inner portion of the retaining pin. Note that an outer peripheral profile of the retaining pin and an inner peripheral profile of the seal member have the same shape and are in close contact with one another, and so the seal member can be efficiently cooled through the retaining pin, enabling the energy required for cooling to be reduced.

Supplement 5

A mold employed to manufacture a pipe joint including a circular tube-shaped housing and an elastically deformable circular tube-shaped seal member provided at an inner peripheral side of the housing, the mold including:

a retaining pin including a cooling channel provided at an inner portion of the retaining pin and configured such that the seal member is fitted to an outer periphery of the retaining pin;

an accommodating area configured to accommodate the seal member fitted to the retaining pin;

a hollow area for molding the housing and disposed adjacent to the accommodating area; and an inflow port for causing a molten resin to flow into the hollow area, wherein, in a cross-section orthogonal to an axial direction of the retaining pin, a mold face of the hollow area that opposes an outer peripheral face of the seal member accommodated in the accommodating area is positioned on a straight line extending along an inflow direction of the molten resin.

In the mold of supplement 5, first, the seal member is fitted to the outer periphery of the retaining pin. The shape of the seal member is thereby maintained by the retaining pin. Next, in a state in which the seal member is fitted to the retaining pin, the seal member fitted to the retaining pin is accommodated in the accommodating area inside the mold. Next, the seal member is cooled through the retaining pin by the fluid flowing through the cooling channel. Next, in a state in which the seal member is cooled, the molten resin is made to flow through the inflow port into the hollow area adjacent to the accommodating area inside the mold so as to mold the housing. The pipe joint provided with the circular tube-shaped seal member at the inner peripheral side of the circular tube-shaped housing is manufactured in this manner.

In this mold, since the molten resin is caused to flow into the hollow area inside the mold in a state in which the seal member is cooled through the retaining pin, a rise in the temperature of the seal member is better suppressed than for example in a mold in which molten resin is caused to flow into the hollow area in a state in which the seal member is not cooled. By suppressing a rise in the temperature of the seal member in this manner, softening of the seal member is suppressed, such that deformation of the seal member due to the inflow pressure of the molten resin is suppressed. This suppresses formation of a gap between the seal member and the retaining pin when the housing of the pipe joint is being molded (when the molten resin flows into the hollow area).

When the molten resin flows into the hollow area, if the molten resin is made to flow in toward the seal member, the inflow pressure of the molten resin occurring when the filling of the molten resin into the hollow area starts might act directly on the seal member, causing the seal member to deform. Note that in this mold, the mold face of the hollow area opposing the outer peripheral face of the seal member accommodated in the accommodating area is positioned on the straight line extending along the inflow direction of the molten resin, and so the inflow pressure of the molten resin occurring when the filling of the molten resin into the hollow area starts does not act directly on the seal member. Thus, in this mold, deformation of the seal member due to the inflow pressure of the molten resin is better suppressed than for example in a mold in which the seal member is positioned on the straight line extending along the inflow direction of the molten resin. This further suppresses formation of a gap between the seal member and the retaining pin when the housing of the pipe joint is being molded.

Note that the entire content of the disclosure of Japanese Patent Application No. 2019-125367 filed on Jul. 4, 2019 is incorporated by reference in the present specification.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A manufacturing method for manufacturing a pipe joint including a circular tube-shaped housing and an elastically deformable circular tube-shaped seal member provided at an inner peripheral side of the housing, the pipe joint manufacturing method comprising:
   placing the seal member inside a mold in a state in which the seal member is fitted to an outer periphery of a retaining pin; and
   causing a molten resin to flow into the mold so as to mold the housing in a state in which the seal member is cooled through the retaining pin.

2. The pipe joint manufacturing method of claim 1, comprising causing the molten resin flow in toward a mold face of the mold opposing an outer peripheral face of the seal member placed inside the mold.

3. The pipe joint manufacturing method of claim 1, comprising continuing cooling the seal member until cooling and hardening of the molten resin filled into the mold is complete.

4. The pipe joint manufacturing method of any one of claim 1, comprising:
   providing a cooling channel at an inner portion of the retaining pin; and
   cooling the seal member through the retaining pin by causing a fluid to flow through the cooling channel.

5. The pipe joint manufacturing method of claim 2, comprising continuing cooling of the seal member until cooling and hardening of the molten resin filled into the mold is complete.

6. The pipe joint manufacturing method of claim 2, comprising:
   Providing a cooling channel at an inner portion of the retaining pin; and
   cooling the seal member through the retaining pin by causing a fluid to flow through the cooling channel.

7. The pipe joint manufacturing method of claim 3, comprising:
   providing a cooling channel at an inner portion of the retaining pin; and
   cooling the seal member through the retaining pin by causing a fluid to flow through the cooling channel.

8. The pipe joint manufacturing method of claim 5, wherein:
   providing a cooling channel at an inner portion of the retaining pin; and
      cooling the seal member through the retaining pin by causing a fluid to flow through the cooling channel.

* * * * *